W. FERRIS.
CONTROL VALVE FOR FRICTION CLUTCH THRUST CYLINDERS.
APPLICATION FILED JULY 11, 1917.
1,290,150.
Patented Jan. 7, 1919.
4 SHEETS—SHEET 1.
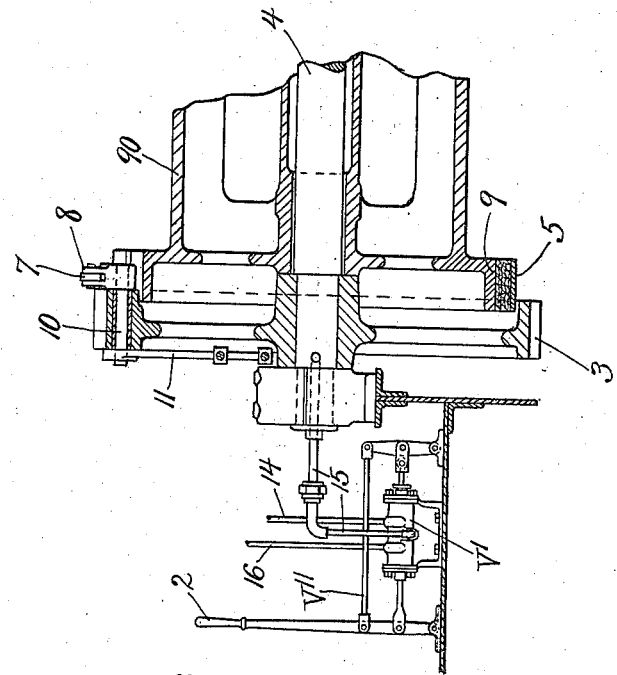
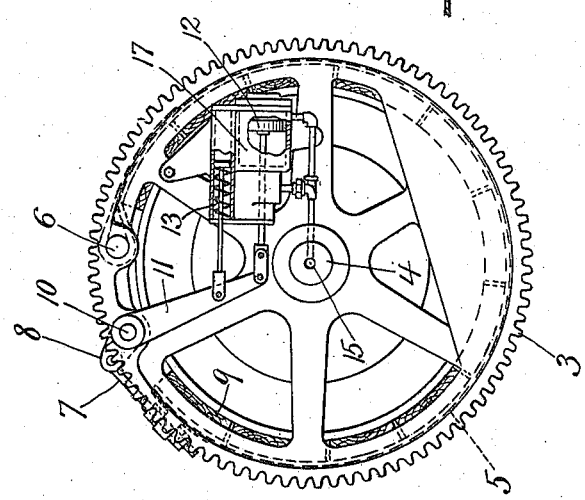
Witnesses.
Edward T. Wray.
Minnie M. Lindeman
Inventor.
Walter Ferris.
by Parker & Carter
Attorneys.

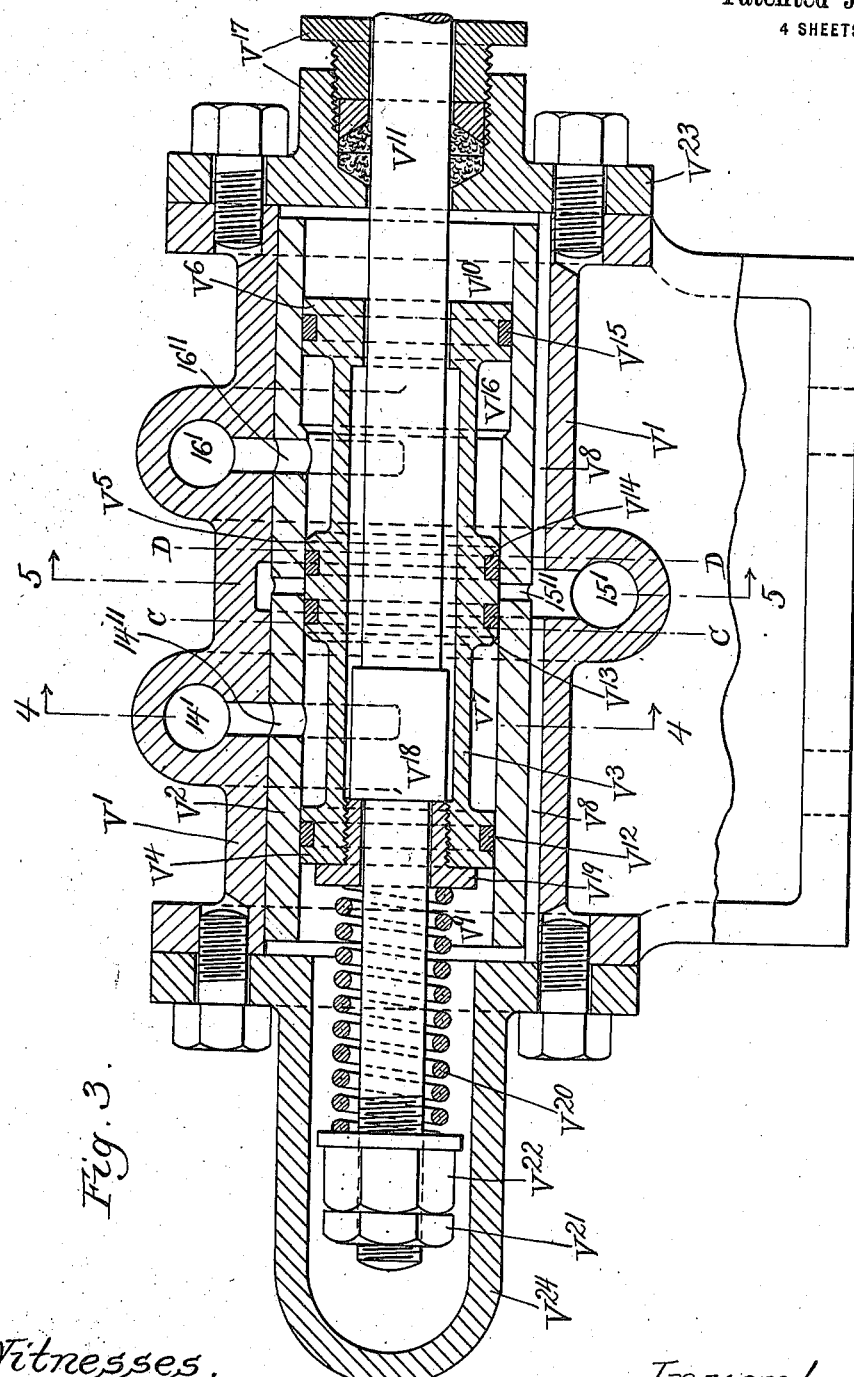

W. FERRIS.
CONTROL VALVE FOR FRICTION CLUTCH THRUST CYLINDERS.
APPLICATION FILED JULY 11, 1917.
1,290,150.
Patented Jan. 7, 1919.
4 SHEETS—SHEET 3.
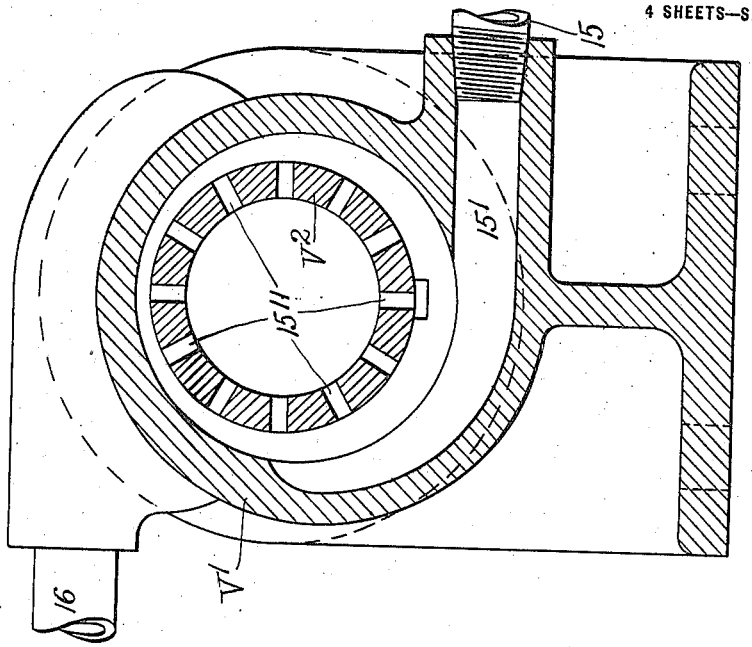
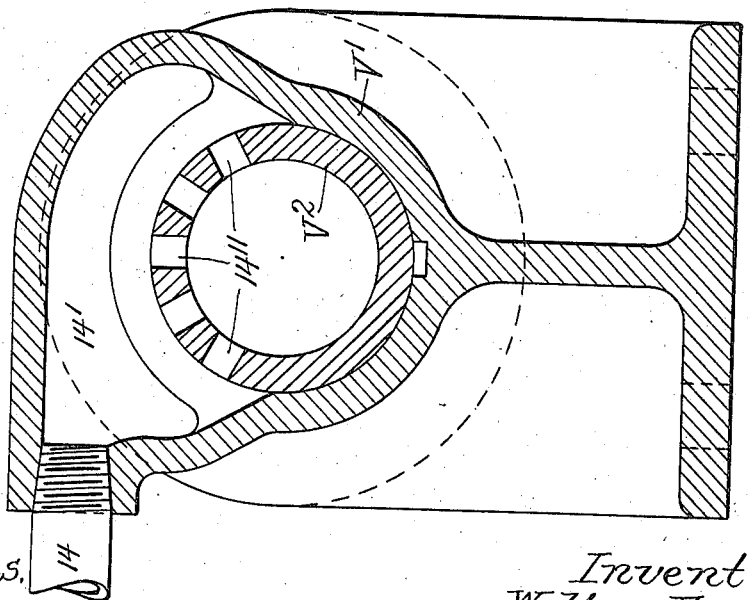
Witnesses,
Edward T. Wray.
Mamie M. Lindenau
Inventor.
Walter Ferris
by Parker & Carter
Attorneys.

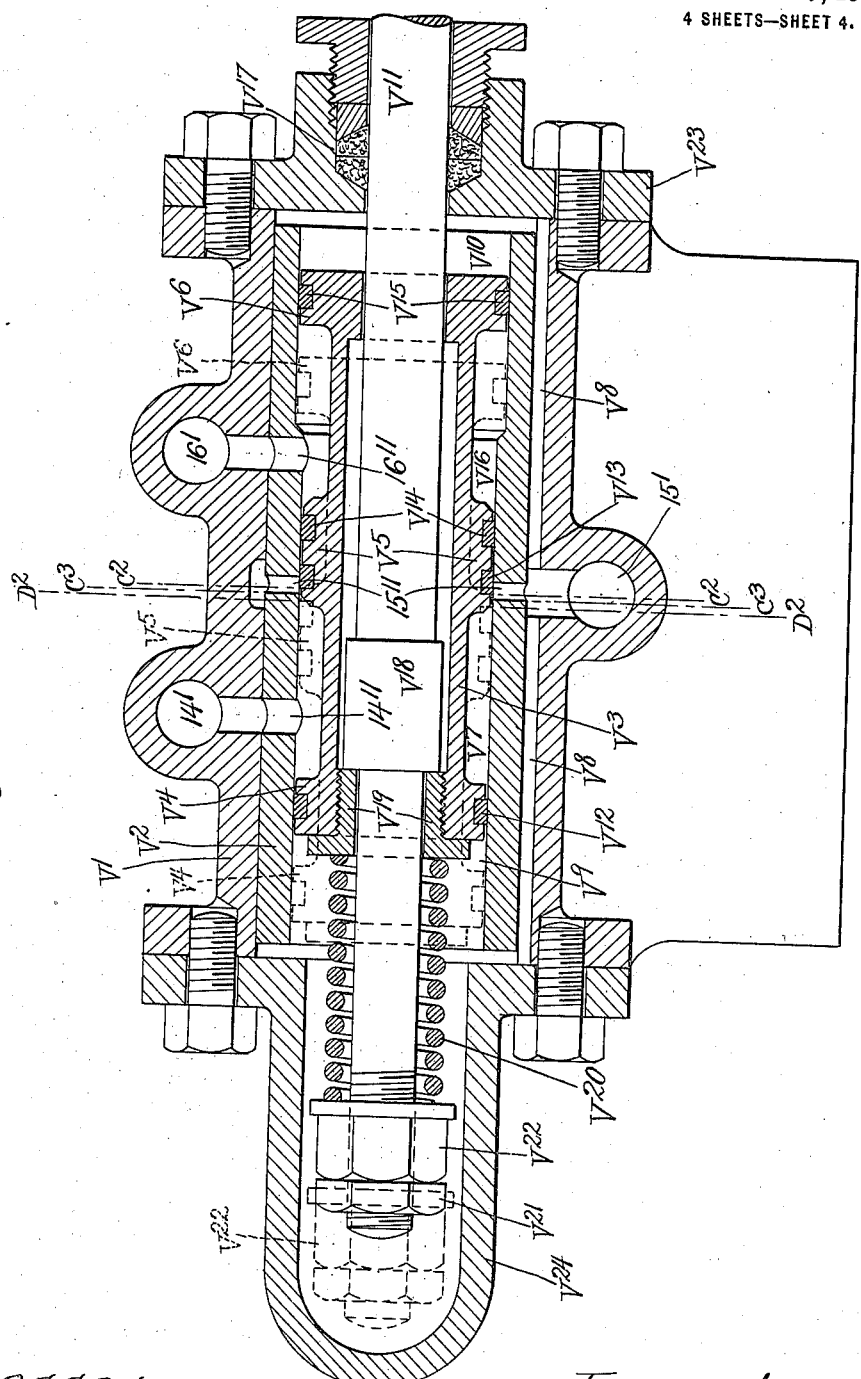

UNITED STATES PATENT OFFICE.

WALTER FERRIS, OF SOUTH MILWAUKEE, WISCONSIN, ASSIGNOR TO BUCYRUS COMPANY, OF SOUTH MILWAUKEE, WISCONSIN, A CORPORATION OF WISCONSIN.

CONTROL-VALVE FOR FRICTION-CLUTCH THRUST-CYLINDERS.

1,290,150.   Specification of Letters Patent.   Patented Jan. 7, 1919.

Application filed July 11, 1917. Serial No. 179,890.

*To all whom it may concern:*

Be it known that I, WALTER FERRIS, a citizen of the United States, residing at South Milwaukee, in the county of Milwaukee and State of Wisconsin, have invented a certain new and useful Improvement in Control Valves for Friction-Clutch Thrust-Cylinders, of which the following is a specification.

One object of this invention is to enable the operator of a friction clutch engaged by fluid pressure to control the force applied to operate said clutch, in such a manner that a given position of the operating lever will cause a certain definite force to act upon friction members, said definite force not being affected by the amount of wear or by inexact adjustment in the friction members or by the temperature of the parts.

Another object of said invention is to provide a pressure reducing valve whereby fluid operating pressure may be admitted to a thrust cylinder without exerting any unbalanced force upon the stem of the operating valve.

Another object of said invention is to enable a controlled variable pressure to be transmitted from a source of pressure on the stationary platform of a machine to a clutch thrusting cylinder mounted upon one of the revolving parts.

Another object of said invention is to provide a device whereby a friction clutch with revolving thrust cylinder may be operated at full capacity or partial capacity, and used either as a hoisting clutch or as a lowering brake at the will of the operator.

The accompanying drawings show this invention carried out with respect to the operation of a familiar type of friction clutch, ordinarily used in connection with steam shovels and dredges. It is equally applicable, however, to any type of friction clutch operated by means of fluid under pressure.

In the usual application of such clutches they are controlled by a three-way steam or air valve by means of which the full available fluid pressure is admitted behind the piston 12 when the operator opens the valve to engage the clutch; and the pressure is entirely released, completely disengaging the clutch, when the operator closes the valve against the admission of fluid pressure to the cylinder and opens the exhaust between the cylinder and the outer air. Slight modifications of this operation are possible by careful manipulation and partial opening of the ports in the valve ordinarily used, but as a matter of practice such a control valve is only capable of operating the friction clutch in the manner above described, so that the clutch is either fully engaged or fully released, but cannot be held at partial engagement so that it will slip more or less easily as may be desired by the operator.

Figure 1 is an end elevation of a friction clutch gear and winding drum, operated by fluid pressure.

Fig. 2 is a partial axial section through winding drum with gear and clutch parts and control valve and associated parts in elevation;

Fig. 3 is an axial section through the control valve:

Fig. 4 is a transverse section on line 4—4 of Fig. 3;

Fig. 5 is a transverse section on line 5—5 of Fig. 3;

Fig. 6 is a section along the same line as Fig. 3 but with the valve stem and associated parts in a different position.

Like parts are indicated by the same numeral in all the figures.

3 is a gear wheel driven by any source of power not shown, keyed to shaft 4 and carrying by means of pins on its periphery a friction band 5. One end of this friction band is anchored upon a pin 6 fixed in the periphery of the gear while the other end is attached by means of an adjustable rod 7 to a lever 8 which is keyed to the inner end of a shaft 10, which passes through a hole in the gear rim and has keyed to its outer end a lever 11. This lever 11 is moved by means of fluid pressure behind a piston 12 by means of piston rod and connection plainly shown in the drawing. When the pressure is relieved behind this piston 12 the lever is moved to the right by means of spring 13, which is compressed during the movement of the lever by the piston. Operating connections between this spring and the lever are also plainly shown.

As the piston is moved outwardly toward the left in Fig. 1 the friction band is tightened, (by means of the levers 8 and 11 and the shaft 10) upon a friction surface 9 formed on a flange of the winding drum 90. Thereby, as the gear revolves, the drum is compelled to revolve with it, winding up the rope. Of course the winding drum is only one application, and any other appropriate device may be driven by such a clutch.

The construction of the improved control valve which forms the basis of the present application is shown in detail in Figs. 3, 4 and 5. In Fig. 2, 14 designates a pipe which is connected to boiler, air reservoir or other source of operating pressure, 15 is a pipe from the control valve to the operating cylinder 17 of the friction clutch and 16 is an exhaust pipe by which the exhausted fluid from the friction clutch 17 is conducted away. The corresponding ports in the valve shown in section in Fig. 3 are designated by the same numerals $14'$, $15'$ and $16'$ respectively, as they are merely continuations of the same passage. The valve comprises a body portion $V^1$ into which is tightly forced a bushing $V^2$. The bushing $V^2$ is provided with a cylindrical bore having a larger diameter at one end and a smaller diameter at the other end. Within this bore slides a piston $V^3$ having three piston heads $V^4$, $V^5$, $V^6$, the two former fitting in the smaller portion of the bore and the head $V^6$ fitting in the larger portion of the bore. The end piston heads $V^4$ and $V^6$ are each provided with one packing ring while the middle piston head is provided with two packing rings. Bushing $V^2$ is pierced by three ports $14''$, $15''$, $16''$ communicating respectively with the openings $14'$, $15'$ and $16'$. Each port consists of a number of separate holes pierced through at the same cross section of the bushing, the bridge between the individual holes serving to keep the packing rings from catching in the ports. Port $14''$ communicates with the annular space $V^7$, the high pressure fluid being retained in this space by packing rings $V^{12}$ and $V^{13}$. Port $15''$ is in communication with the piston only around its periphery and between the two rings $V^{13}$ and $V^{14}$. Port $16''$ communicates with the annular space $V^{16}$ between the middle piston head and the large piston head $V^6$, rings $V^{14}$ and $V^{15}$ preventing fluid in port $15''$ and communicating passages from leaking into the exhaust port $V^{16}$.

The valve piston $V^3$ with its piston rings is moved within the bore by the valve stem $V^{11}$ sliding through stuffing box $V^{17}$ having an enlarged portion $V^{18}$ which abuts against a shoulder nut $V^{19}$ which is screwed into the end of the valve piston opposite to the stuffing box. A smaller portion of valve stem projects through this nut, is surrounded by spring $V^{20}$ which is maintained under initial compression by means of lock nuts $V^{21}$, $V^{22}$.

The open ends of the valve body $V^1$ are closed by two end heads $V^{23}$ and $V^{24}$. The stem $V^{11}$ is operated as desired, by means of the lever 2— Fig. 2.

It will be observed that the valve piston $V^3$ is capable of slidable movement along the valve stem $V^{11}$ if acted upon by force sufficient to overcome the initial compression of the spring $V^{20}$. The fluid in the port $15'$ is in communication through ducts $V^8$ with the spaces $V^9$ and $V^{10}$ at the two ends of the valve piston. As the area of the piston on the end at $V^{10}$ is larger than that on the end at $V^9$, a certain predetermined pressure in port $15'$ will accomplish the endwise sliding of valve $V^3$ on its stem. As the operating pressure from boiler or air reservoir in port $14'$ is balanced, the area at each end of the space $V^7$ being the same, this pressure will not affect any endwise movement of the valve which might otherwise be produced. As the pressure in port $16'$ is atmospheric, the fact that the exposed area at one end of the space $V^{16}$ is larger than at the other end, does not affect any endwise sliding of the valve which would be otherwise produced.

The use and operation of my invention are as follows:—

When the clutch is in the released position consequent upon the completion of the previous cycle, the valve piston $V^3$ will be in the location indicated in dotted lines in Fig. 6, with cutoff edge DD, Fig. 3 of ring $V^{14}$ located at line $D^2 D^2$ on Fig. 6. Ports $15'$ and $16'$ are then in communication, permitting atmospheric pressure to exist in cylinder 17 and communicating parts. Port $14'$ and annular space $V^7$ are filled with fluid at operating pressure. To set the clutch, operator throws lever 2 to move stem $V^{11}$ to the right of the figure. Cutoff edge CC, Fig. 3 of the packing ring $V^{13}$ then takes position $C^2$ (Fig. 6), partly opening port $15''$ and thereby placing this port, and through it the thrust cylinder 17, in communication with the source of operating fluid under pressure. The operating fluid will therefore force the piston 12 outwardly and consequently tighten the friction band upon the clutch housing 9. During the first part of its motion piston 12 will encounter little resistance and the pressure in port $15'$ will be small, while the full operating pressure exists in port $14'$ and space $V^7$ around the valve piston. When the thrusting piston 12 has moved forward sufficiently to tighten the friction band, its movement becomes slow or ceases and the pressure in port $15'$ accumulates back of the piston 12 and through all of the associated passages on the same side of the cutoff edge of ring $V^{13}$. This pressure therefore also rises in passages $V^8$ and in the chambers $V^9$ and $V^{10}$ at the two ends of the valve piston. As already explained, the exposed area of piston $V^{10}$ is larger than the corresponding area at $V^9$ and the piston would therefore be immediately moved along on the valve stem by the excess pressure on end at $V^{10}$, except for the initial tension in spring $V^{20}$ which holds the piston against shoulder of stem enlargement $V^{18}$. This spring $V^{20}$ is so proportioned and adjusted that when pressure in port 15′ and cylinder 17 has risen to a predetermined amount, say 25 pounds per square inch, the resistance of the spring will be overcome and the valve will move lengthwise along the stem until load upon the spring $V^{20}$ is sufficiently increased to resist the excess pressure of the fluid on the other end of the valve piston.

If the valve has only been slightly opened as shown in Fig. 6, the sliding of valve piston along the stem will be checked as soon as the cutoff edge CC of ring $V^{13}$ has moved the short distance from position $C^2$ $C^2$ to position $C^3$ $C^3$, where the port 15′ is cut off, thereby checking the rise of pressure at a pressure but slightly above that at which the initial spring tension was overcome. If the valve was moved to open the port wider, a greater increase of pressure will be required to close it. It is obvious that each position of valve stem $V^{11}$ corresponds to a position of operating lever 2, selected at the discretion of the operator; and that when the operator places this lever in any given position the valve will operate to admit fluid under pressure to the thrusting cylinder until the pressure in that cylinder has risen to an amount predetermined for that position of the operating lever. Should the operator move the lever farther away from zero position, a higher pressure will be reached in the thrust cylinder before the sliding valve piston is pushed along the valve stem against the resistance of the spring sufficiently to close the port 15′ and check further rise of pressure. Cutoff edge CC may be either moved to position $C^2$ $C^2$ slightly uncovering ports 15″ and permitting slow building up of pressure in thrust cylinder as already described, or these ports may be thrown wide open if the clutch is to be used at maximum pressure and no graduated action is desired. If during the operation of the clutch, while lifting or driving a load the operator desires to reduce the capacity of the clutch and permit the load to slip or slacken in speed, he has only to move the lever back to the appropriate position when the valve will automatically reduce to, and maintain, the required lower pressure in the thrust cylinder. If the clutch is used to lift a load or operate an excavating dipper, the load may thereby be permitted to descend slowly or rapidly as desired; or the force to be exerted on the excavating dipper during digging may be held at a point below the maximum capacity of the clutch in order to protect breakable parts.

The object of avoiding any end thrust on the valve stem $V^{11}$ which might tend to move the operating lever against the intention of the operator, is carried out in the above described construction in the following manner:—The net area of the valve stem as it passes through the stuffing box is subjected to any pressure which may momentarily exist in the port 15′, communicating with the exposed left hand end of the valve stem through the passage $V^8$. The difference of area between the left hand end of the valve piston at $V^9$ and the right hand end at $V^{10}$ is so proportioned as to be equal to this same valve stem area and is exposed to the same pressure; but as the excess is at the right hand end and acts toward the left hand end, it is exactly equal and opposite in sense to the pressure on the exposed left hand end of the valve stem. There is therefore no tendency to move the valve stem on account of these pressures.

Therefore by merely placing his operating lever in any given position the operator selects a pressure which he desires to act upon the thrusting piston 12, and the valve will permit the pressure in the thrusting cylinder 17 to rise to that amount, and hold it there automatically as long as the lever is maintained at the selected position. After the steam has been cut off, should any of it leak out or condense in the thrusting cylinder, reducing the pressure in that cylinder and the associated ports 15′—15″, the excess pressure on the end of the valve piston at the chamber $V^{10}$ will drop correspondingly and spring $V^{20}$ will automatically slide the valve piston to the right uncovering the edge of port 15″ and admitting enough additional fluid under pressure to restore the selected operating pressure in thrusting cylinder 17.

When the operator desires to release the friction clutch the lever is thrown to a position which slides the valve stem and valve piston to the left of the Figs. 3 or 6 until the cutoff edge DD of ring $V^{14}$ has uncovered the port 15″ thereby placing ports 15′ and 16′ in communication through space $V^{16}$ between the central and right hand heads of the valve piston. This permits the pressure to exhaust from the thrust cylinder 17, permitting the spring 13 to return the piston 12 to its zero position, releasing the friction band. It is obvious that many other arrangements beside that shown in the figure may be made of the essential elements of this invention, and I do not restrict myself to the exact form illustrated herein.

I claim:

1. A pressure controlling valve comprising a ported casing, a cutoff member which controls the opening and closing of the ports, an operating member on which the cut-off member slides, and a yielding connection between it and the cutoff member.

2. A pressure controlling valve comprising a ported casing, a cutoff member co-acting with the ports, an operating member on which the cut-off member slides, and a yielding connection between the operating member and the cutoff member whereby the cutoff member is permitted to move relatively to the ports, while the operating member is stationary.

3. A pressure controlling valve comprising a ported casing, an operating member which slides on the operating member, and a cutoff member co-acting with the ports and with the operating member, a yielding connection between the operating and the cutoff members, the movement of the cutoff member being jointly controlled by the operating member and by the pressure existing within the valve casing.

4. A pressure controlling valve comprising a valve stem, a valve sliding upon said stem, a valve chamber with ports controlled by said valve and a spring controlling the position of the valve upon the stem.

5. A pressure controlling valve comprising a valve stem, a piston valve sliding upon said stem, a valve chamber with ports controlled by said piston valve and a spring controlling the position of the piston valve upon the stem.

6. A pressure controlling valve comprising a valve stem, a valve slidable upon said stem, a valve chamber with ports, controlled by said valve, a source of fluid pressure communicating with said ports, a spring tending to move the valve in one direction upon the valve stem, the valve having an unbalanced area whereby the fluid pressure existing within the casing tends to move the valve in the opposite direction.

7. A pressure controlling valve comprising a valve stem, a piston valve slidable upon said stem, a valve chamber with ports controlled by said valve, a source of fluid pressure communicating with said ports, a spring tending to move the piston valve in one direction upon the valve stem, the valve having an unbalanced area whereby the fluid pressure existing within the casing tends to move the valve in the opposite direction.

8. A pressure controlling valve comprising a slidable operating stem, a cylindrical piston valve slidably mounted upon said stem and being formed with piston heads of varying diameters, a valve casing closely fitting around said piston valve and having corresponding diameters, a spring tending to move the piston in one direction upon the valve stem and a fluid pressure tending to move the piston in the other direction in opposition to the spring.

9. A pressure controlling apparatus comprising a source of fluid pressure, a valve casing having ports, a piston valve sliding within the casing and controlling said ports, an operating stem entering one end of the casing through a closely fitting aperture and having the inner end of said stem exposed to fluid pressure within the casing, the piston valve having an unbalanced area exposed to the same fluid pressure and so arranged that the pressure acts in opposite directions upon the valve and upon the stem, and a yielding connection between the valve and the stem.

10. A pressure controlling apparatus comprising a source of fluid pressure, a valve casing having ports, a piston valve sliding within the casing and controlling said ports, an operating stem entering one end of the casing through a closely fitting aperture and having the inner end of said stem exposed to fluid pressure within the casing, the piston valve having an unbalanced area exposed to the same fluid pressure and so arranged that the pressure acts in opposite directions upon the valve and upon the stem, and a yielding connection between the valve and the stem, whereby the said unbalanced pressure may move the valve upon the stem by deflecting said yielding connection.

11. A pressure controlling apparatus comprising a source of fluid pressure, a valve casing having ports, a piston valve sliding within the casing and controlling said ports, an operating stem entering one end of the casing through a closely fitting aperture and having the inner end of said stem exposed to fluid pressure within the casing, the piston valve having an unbalanced area substantially equal to the cross sectional area of the valve stem in the aperture where it enters the casing and exposed to the same fluid pressure, acting in opposite directions upon the valve and upon the stem.

12. A pressure controlling apparatus comprising a source of fluid pressure, a valve casing having ports, a piston valve sliding within the casing and controlling said ports, an operating stem entering one end of the casing through a closely fitting aperture and having the inner end of said stem exposed to fluid pressure within the casing, the piston valve having an unbalanced area substantially equal to the cross sectional area of the valve stem in the aperture where it enters the casing and exposed to the same fluid pressure acting in opposite directions upon the valve and upon the stem, a yielding connection between the valve and the stem whereby the said fluid pressures may move the valve upon the stem by deflecting said yielding connection, the fluid pressures upon the exposed end of the stem and upon the unbalanced area of the valve being in opposite directions and canceling each other so that no resultant force is transmitted to the operating connections.

13. In a pressure controlled system a positively operated fluid control valve and means responsive to variations in the pressure of the fluid controlled by the valve for controlling the operation of the valve said means including a part forming a slidable connection between the valve and the mechanical control and yielding means for holding the valve in normal position.

14. A control valve for fluid systems comprising a mechanically operated control member, a valve member slidable therealong and yielding means interposed between such control member and the valve member and pressure control means for moving the valve against such yielding means.

15. A control valve for fluid systems comprising a mechanically operated control member, a valve member slidable therealong and yielding means interposed between such control member and the valve member and pressure control means for moving the valve against such yielding means the valve being positively held against movement with respect to the mechanically controlled means in one direction while free to move against the yielding means in the opposite direction.

16. A valve for fluid control comprising a control rod and means for positively moving it, a piston valve slidable on the rod, yielding means interposed between the valve and the rod for resisting movement of the valve with respect to the rod in one direction and positive means for resisting movement in the other, a valve housing in which the valve reciprocates and means on the valve and in the housing for moving the valve against such yielding means in response to variations in the pressure.

17. A valve for fluid control comprising a control rod and means for positively moving it, a piston valve slidable on the rod, yielding means interposed between the valve and the rod for resisting movement of the valve with respect to the rod in one direction and positive means for resisting movement in the other, a valve housing in which the valve reciprocates and means on the valve and in the housing for moving the valve against such yielding means in response to variations in the pressure and means for balancing the valve and piston rod to prevent movement of the piston rod in response to variations in the pressure.

18. A pressure controlling valve comprising a slidable operating stem, a cylindrical piston valve slidably mounted upon said stem and being formed with piston heads of varying diameters, a valve casing closely fitting around said piston valve and having corresponding diameters, a spring tending to move the piston in one direction upon the valve stem and a fluid pressure tending to move the piston in the other direction in opposition to the spring said spring being within the valve casing.

19. A pressure controlling valve comprising a valve stem, a valve sliding upon said stem, a projection on one end of said stem, a spring mounted on the stem between the projection and the valve and controlling the position of the valve on the stem, a valve chamber with ports controlled by said valve.

20. A pressure controlling valve comprising a valve stem, a valve sliding upon said stem, a projection on one end of said stem, a spring mounted on the stem between the projection and the valve and controlling the position of the valve on the stem, a valve chamber with ports controlled by said valve and an extension therefrom inclosing one end of the valve stem and spring.

21. In a pressure controlling valve a cut-off member which controls the opening and closing of the ports an operating stem and a sliding connection between the operating stem and the cut-off member.

22. In a pressure controlling valve a cut-off member which controls the opening and closing of the ports an operating member and a sliding connection between the operating member and the cut-off member and a spring connection between the operating member and the cut-off member.

In testimony whereof, I affix my signature in the presence of two witnesses this fifth day of July 1917.

WALTER FERRIS.

Witnesses:
   KATHRYN O'CONNELL,
   WALTER HELM.